A. A. PHILBRICK.
Wheel for Vehicles.
No. 162,414. Patented April 20, 1875.
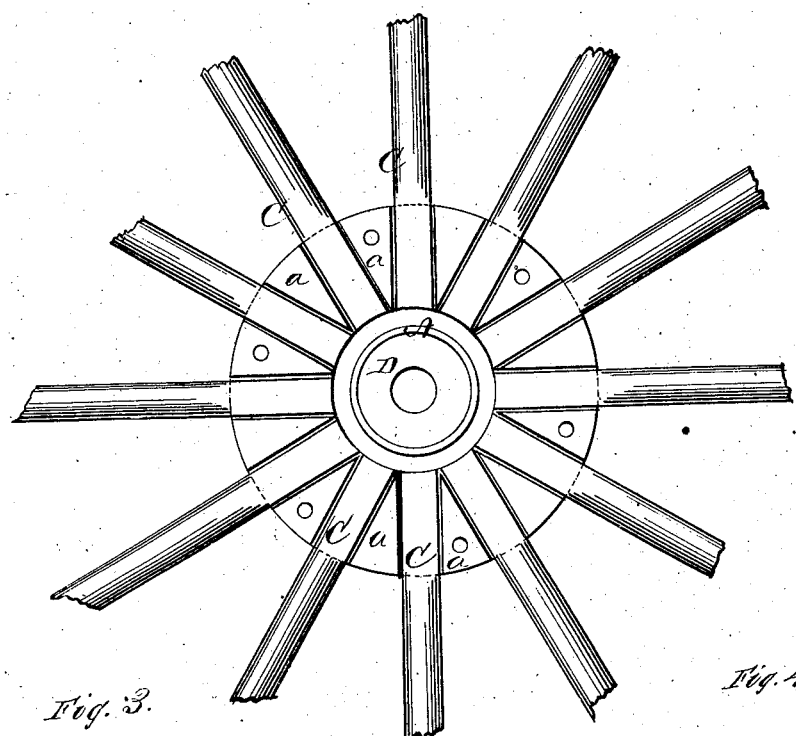
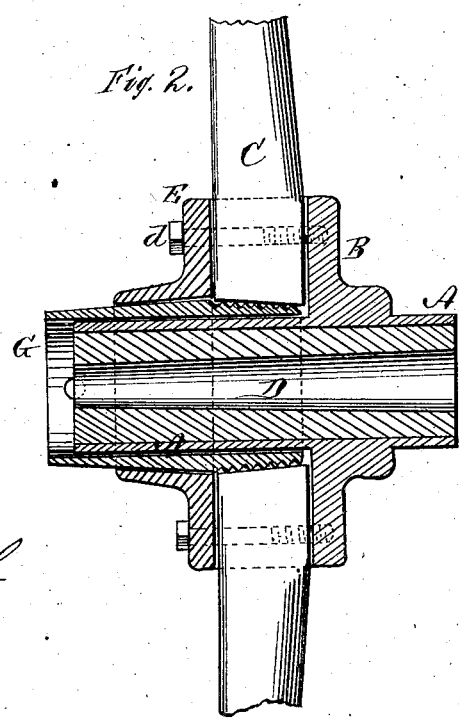
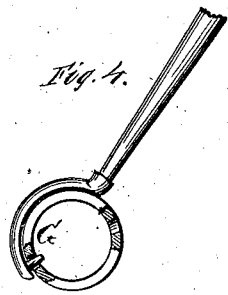

UNITED STATES PATENT OFFICE.

ALVAH A. PHILBRICK, OF COLDWATER, MICHIGAN.

IMPROVEMENT IN WHEELS FOR VEHICLES.

Specification forming part of Letters Patent No. 162,414, dated April 20, 1875; application filed November 10, 1874.

*To all whom it may concern:*

Be it known that I, A. A. PHILBRICK, of the city of Coldwater, in the county of Branch and State of Michigan, have invented certain new and useful Improvements in Wheels; and I do hereby declare that the following is a full, clear, and exact description thereof, reference being had to the accompanying drawings, and to the letters of reference marked thereon, which form part of this specification.

The nature of my invention consists in the construction and arrangement of a hub for wheel for vehicles, as will be hereinafter more fully set forth.

In order to enable others skilled in the art to which my invention appertains to make and use the same, I will now proceed to describe its construction and operation, referring to the annexed drawing, in which—

Figure 1 is a side view of a wheel embodying my invention with the back flange removed. Fig. 2 is a longitudinal section of the wheel. Fig. 3 is a side view of a screw-thimble used in the hub; and Fig. 4 is an end view of the same.

A represents a metallic tube of any suitable dimensions provided with a circumferential band, B, having V-shaped lugs or projections $a$ on its outer surface to form mortises for the spokes C C. Within the tube or barrel A is placed a wooden core, D, so that any kind of axle may be used. The spokes C C are put in on the back side of the hub with a dovetail end, or largest on the inside, and secured by a band, E, bolted against them from the back side by bolts $d\ d$. G represents a combined sand-band and screw-thimble, which is passed over the outer end of the barrel A, and through the central opening in the back band E, following under the ends of the spokes, threads being cut in the ends of the spokes, so as to expand the wheel to the rim and tire at will, thereby keeping the rim and tire tight.

The spokes have no shoulders, and the barrel A of the hub is made smallest at the front edge of the spoke, which allows the spoke to have the same incline as the screw-thimble and sand-band.

Having thus fully described my invention, what I claim as new, and desire to secure by Letters Patent, is—

1. The sand-band G, extended to form a tapering screw-thimble at its inner end to enter between the hub-barrel and inner ends of the spokes for expanding the spokes, as set forth.

2. The combination of the barrel A, provided with band B having V-shaped projections $a$, the spokes C, back band E, and combined sand-band and screw-thimble G, all substantially as and for the purposes set forth.

In testimony that I claim the foregoing as my own I affix my signature in presence of two witnesses.

ALVAH A. PHILBRICK.

Witnesses:
MANTON E. SERWIN,
H. H. BARLOW.